United States Patent
Breton et al.

(10) Patent No.: US 8,207,251 B2
(45) Date of Patent: Jun. 26, 2012

(54) LOW POLARITY NANOPARTICLE METAL PASTES FOR PRINTING APPLICATION

(75) Inventors: Marcel P. Breton, Mississauga (CA); Yiliang Wu, Oakville (CA); Stephan V. Drappel, Toronto (CA)

(73) Assignee: Xerox Corporation, Norwalk, CT (US)

( * ) Notice: Subject to any disclaimer, the term of this patent is extended or adjusted under 35 U.S.C. 154(b) by 547 days.

(21) Appl. No.: 12/408,897

(22) Filed: Mar. 23, 2009

(65) Prior Publication Data

US 2010/0239750 A1 Sep. 23, 2010

(51) Int. Cl.
C08K 5/00 (2006.01)
C08K 3/08 (2006.01)
(52) U.S. Cl. .......................... 524/236; 524/439
(58) Field of Classification Search .............. 524/236
See application file for complete search history.

(56) References Cited

U.S. PATENT DOCUMENTS

| | | | |
|---|---|---|---|
| 3,951,657 A | 4/1976 | Recchia et al. | |
| 3,959,238 A | 5/1976 | Hokama et al. | |
| 3,960,572 A | 6/1976 | Ibata et al. | |
| 3,993,626 A | 11/1976 | Laurito | |
| 4,057,682 A | 11/1977 | Ruckel et al. | |
| 4,113,653 A | 9/1978 | Ruckel et al. | |
| 4,323,637 A | 4/1982 | Chen et al. | |
| 4,427,759 A | 1/1984 | Gruetzmacher et al. | |
| 4,471,106 A | 9/1984 | Luecke et al. | |
| 4,487,901 A | 12/1984 | Malpass, Jr. | |
| 5,849,072 A * | 12/1998 | Sommer et al. | 106/403 |
| 6,121,392 A | 9/2000 | Thompson | |
| 7,270,694 B2 | 9/2007 | Li et al. | |
| 2004/0158003 A1 | 8/2004 | Ruckel et al. | |
| 2007/0099357 A1 * | 5/2007 | Li et al. | 438/149 |
| 2008/0014454 A1 | 1/2008 | Deshpande et al. | |
| 2008/0254214 A1 | 10/2008 | Kassa et al. | |
| 2010/0143591 A1 * | 6/2010 | Wu et al. | 427/256 |

FOREIGN PATENT DOCUMENTS

| | | |
|---|---|---|
| DE | 197 56 790 A1 | 7/1999 |
| DE | 102 58 961 A1 | 7/2004 |
| DE | 10 2007 050 875 A1 | 4/2008 |
| EP | 1 646 095 A2 | 4/2006 |
| GB | 1 311 889 | 3/1970 |
| WO | WO 94/28074 | 12/1994 |

OTHER PUBLICATIONS

Oxford University, MSDS for Dodecane, Sep. 2003.*
U.S. Appl. No. 12/013,539, filed Jan. 14, 2008.
U.S. Appl. No. 12/113,628, filed May 1, 2008.
U.S. Appl. No. 12/133,548, filed Jun. 5, 2008.
U.S. Appl. No. 11/950,450, filed Dec. 5, 2007.

* cited by examiner

*Primary Examiner* — Hui Chin
(74) *Attorney, Agent, or Firm* — Oliff & Berridge, PLC

(57) ABSTRACT

A composition that may be used to form an electronic circuit element includes metal nanoparticles in a metal nanoparticle solution, at least a low-polarity additive and a solvent. The low-polarity additive is either a styrenated terpene resin or a polyterpene resin. The composition may be used to form conductive features on a substrate by depositing the composition onto a substrate, and heating the deposited composition on the substrate to a temperature from about 80° C. to about 200° C. to form conductive features on the substrate.

18 Claims, No Drawings

LOW POLARITY NANOPARTICLE METAL PASTES FOR PRINTING APPLICATION

BACKGROUND

Flexographic printing is a method of direct rotary printing that uses a resilient relief image carrier to print articles such as cartons, bags, labels, newspapers, food or candy wrappers or books. Flexographic printing has found particular application in packaging, where it has displaced rotogravure and offset lithography printing techniques in many cases. Flexographic plates can be prepared from a printing plate precursor having a layer consisting of a photo-polymerizable composition, which generally comprises an elastomeric binder, at least one monomer and a photo-initiator. Early patents on flexographic printing plates include U.S. Pat. Nos. 3,960,572, 3,951,657, 4,323,637 and 4,427,759, the disclosure of each of which is entirely incorporated herein by reference.

Fabrication of electronic circuit elements using metal nanoparticle liquid deposition techniques is of profound interest as such techniques provide potentially low-cost alternatives to conventional mainstream amorphous silicon technologies for electronic applications such as thin film transistors (TFTs), light-emitting diodes (LEDs), RFID tags, photovoltaics, etc. However the deposition and/or patterning of functional electrodes, pixel pads, and conductive traces, lines and tracks which meet the conductivity, processing, and cost requirements for practical applications have been a great challenge.

Flexographic inks may be water- or solvent-based. Flexographic inks are known as liquid inks because of their low viscosity: 10 to 100 cP under printing conditions. Prints produced by flexography can fulfill a wide range of functional effects other than the provision of information such as anti-static properties, for example, for packaging for electronic components sensitive to electrical discharges, and electro-conductive properties.

Previous approaches to conductive inkjet ink formulations have used silver nanoparticles stabilized with alkylamines in a blend of terpineol and dodecane to formulate a low-viscosity (less than 5 cP) with a silver loading of 40% by weight, for example, as described in U.S. Pat. No. 7,270,694, which is incorporated by reference herein in its entirety. However, flexographic inks formulations typically require a higher viscosity and metal loading than inkjet ink formulations.

SUMMARY

What is still desired is a conductive ink formulation with a higher viscosity and metal loading that is suitable for use in flexography and screen printing applications.

The above and other issues are addressed by the present application, wherein in embodiments, the application relates to a composition comprising a metal nanoparticle solution including metal nanoparticles and a stabilizer, a low-polarity additive and a solvent, wherein the low-polarity additive is a styrenated terpene resin or a polyterpene resin.

In embodiments, described is a composition comprising a metal nanoparticle solution including metal nanoparticles and a stabilizer, at least two low-polarity additives, and a solvent, wherein the at least two low-polarity additives are selected from the group consisting of styrenated terpene resins, polyterpene resins, aliphatic hydrocarbon resins, phenol-modified hydrocarbon resins, poly(styrene-allyl) alcohols, polyamide resins and mixtures thereof.

In further embodiments, described is a method of forming conductive features on a substrate, the method comprising: providing a dispersed solution comprised of metal nanoparticles, a low-polarity additive and a solvent, depositing the solution onto the substrate, and heating the solution on the substrate to a temperature from about 80° C. to about 200° C. to form conductive features on the substrate, and wherein the low-polarity additive is a styrenated terpene resin or a polyterpene resin.

EMBODIMENTS

Described herein is a composition with a sufficient amount of metal loading and viscosity to be used in flexographic and screen printing applications. The composition is comprised of at least a metal nanoparticle solution, a low-polarity additive and a solvent.

The term "nano" as used in "metal nanoparticles" refers to, for example, a particle size of less than about 1,000 nm, such as, for example, from about 0.5 nm to about 1,000 nm, for example, from about 1 nm to about 500 nm, from about 1 nm to about 100 nm, from about 1 nm to about 25 nm or from about 1 to about 10 nm. The particle size refers to the average diameter of the metal particles, as determined by TEM (transmission electron microscopy) or other suitable method.

The metal nanoparticle solution herein includes a metal nanoparticle in a liquid solution. In embodiments, the metal nanoparticles are composed of (i) one or more metals or (ii) one or more metal composites. Suitable metals may include, for example, Al, Ag, Au, Pt, Pd, Cu, Co, Cr, In, and Ni, particularly the transition metals, for example, Ag, Au, Pt, Pd, Cu, Cr, Ni, and mixtures thereof. Silver may be used as a suitable metal. Suitable metal composites may include Au—Ag, Ag—Cu, Ag—Ni, Au—Cu, Au—Ni, Au—Ag—Cu, and Au—Ag—Pd. The metal composites may also include non-metals, such as, for example, Si, C, and Ge. The various components of the metal composite may be present in an amount ranging for example from about 0.01% to about 99.9% by weight, particularly from about 10% to about 90% by weight.

The metal nanoparticles may be a mixture of two or more bimetallic metal nanoparticle species, such as those described in commonly assigned U.S. patent application Ser. No. 12/113,628 to Naveen Chopra et al. filed May 1, 2008, which is incorporated herein by reference in its entirety, or a bimodal metal nanoparticle, such as those described in U.S. patent application Ser. No. 12/133,548 to Michelle N. Chretien filed Jun. 5, 2008, which is also incorporated by reference in its entirety.

If the metal nanoparticle is silver, the silver nanoparticles have a stability (that is, the time period where there is minimal precipitation or aggregation of the silver-containing nanoparticles) of, for example, at least about 1 day, or from about 3 days to about 1 week, from about 5 days to about 1 month, from about 1 week to about 6 months, from about 1 week to over 1 year.

The metal nanoparticle solution may also contain an organic stabilizer that is connected to the surface of the metal nanoparticles and is not removed until the annealing of the metal nanoparticles during formation of metal features on a substrate.

In embodiments, the stabilizer complex is physically or chemically associated with the surface of the metal nanoparticles. In this way, the nanoparticles have the stabilizer thereon outside of a liquid solution. That is, the nanoparticles with the stabilizer thereon may be isolated and recovered from a reaction mixture solution used in forming the nanoparticles and stabilizer complex. The stabilized nanoparticles may thus be subsequently readily and homogeneously dispersed in a solvent for forming a printable solution.

As used herein, the phrase "physically or chemically associated" between the metal nanoparticles and the stabilizer can be a chemical bond and/or other physical attachment. The chemical bond can take the form of, for example, covalent bonding, hydrogen bonding, coordination complex bonding, or ionic bonding, or a mixture of different chemical bonds. The physical attachment can take the form of, for example, van der Waals' forces or dipole-dipole interaction, or a mixture of different physical attachments.

The term "organic" in "organic stabilizer" refers to, for example, the presence of carbon atom(s), but the organic stabilizer may include one or more non-metal heteroatoms such as nitrogen, oxygen, sulfur, silicon, halogen, and the like. The organic stabilizer may be an organoamine stabilizer such as those describe in U.S. Pat. No. 7,270,694, which is incorporated by reference herein in its entirety. Examples of the organoamine are an alkylamine, such as for example butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and the like, or mixtures thereof.

Examples of other organic stabilizers include, for example, thiol and its derivatives, —OC(═S)SH (xanthic acid), polyethylene glycols, polyvinylpyridine, polyvinylpyrrolidone, and other organic surfactants. The organic stabilizer may be selected from the group consisting of a thiol such as, for example, butanethiol, pentanethiol, hexanethiol, heptanethiol, octanethiol, decanethiol, and dodecanethiol; a dithiol such as, for example, 1,2-ethanedithiol, 1,3-propanedithiol, and 1,4-butanedithiol; or a mixture of a thiol and a dithiol. The organic stabilizer may be selected from the group consisting of a xanthic acid such as, for example, O-methylxanthate, O-ethylxanthate, O-propylxanthic acid, O-butylxanthic acid, O-pentylxanthic acid, O-hexylxanthic acid, O-heptylxanthic acid, O-octylxanthic acid, O-nonylxanthic acid, O-decylxanthic acid, O-undecylxanthic acid, O-dodecylxanthic acid. Organic stabilizers containing a pyridine derivative (for example, dodecyl pyridine) and/or organophosphine that can stabilize metal nanoparticles may also be used as a potential stabilizer.

Further examples of organic stabilizers may include: the carboxylic acid-organoamine complex stabilized metal nanoparticles, described in U.S. patent application Ser. No. 11/950,450 filed on Dec. 5, 2007; the carboxylic acid stabilizer metal nanoparticles described in U.S. Patent App. Pub. No. 2007/0099357 A1, and the thermally removable stabilizer and the UV decomposable stabilizers described in U.S. patent application Ser. No. 12/013,539 filed on Jan. 14, 2008, each of which is incorporated by reference herein in its entirety.

The extent of the coverage of stabilizer on the surface of the metal nanoparticles can vary, for example, from partial to full coverage depending on the capability of the stabilizer to stabilize the metal nanoparticles. Of course, there is variability as well in the extent of coverage of the stabilizer among the individual metal nanoparticles.

The weight percentage of the optional stabilizer in the metal nanoparticle solution may be from, for example, about 5 weight percent to about 80 weight percent, from about 10 weight percent to about 60 weight percent or from about 15 weight percent to about 50 weight percent.

In embodiments, the composition further comprises a low-polarity additive. The low-polarity additive compound may be a polyterpene resin or a styrenated terpene resin. The weight average molecular weight of the resins is between 800 and 3000, with a softening point ranging from about 75° C. to about 140° C. The low polarity additives have a solubility parameter of less than 19 $(MPa)^{1/2}$, in some embodiments in the range of 15 to 19 $(MPa)^{1/2}$.

Polyterpene resins are resins that are prepared by polymerizing a terpene as the sole hydrocarbon monomer. Example terpene hydrocarbon monomers may include terpenes, such as, for example, δ-2-carene, δ-3-carene, dipentene, limonene, myrcene, β-phellandrene, α-pinene, β-pinene, α-terpinene, γ-terpinene, and terpinolene, such as those described in U.S. Patent Application Pub. No. 2004/0158003, the disclosure of which is incorporated by reference in its entirety. Each of these terpenes may be obtained from various commercial suppliers, such as, for example, Aldrich Chemical (Milwaukee, Wis.), Arizona Chemical Company (Jacksonville, Fla.), Millennium Specialty Chemicals (Jacksonville, Fla.), International Flavors and Fragrances (formerly Bush Boake Allen in Jacksonville, Fla.), or DRT (Les Derives Resiniques et Terpeniques of Dax, France).

In one aspect, the polyterpene resin is the cationic polymerization product of a terpene. The polyterpene resin may be prepared by cationic polymerization of resin-grade β-pinene monomer, limonene monomer, or a mixture of the two monomers. Cationic polymerization of terpenes may be achieved by treating the terpene with a Lewis acid catalyst. More specifically, catalysts that may be used include aluminum chloride ($AlCl_3$) and boron trifluoride ($BF_3$) and their derivatives (for example their etherates or other solvated form); as well as acidic clays, antimony halides, strong protic acids such as hydrofluoric acid and sulfuric acid, and titanium tetrachloride. The catalysts may be removed from the resin. The terpene resins, so produced, may be further subjected to treatment at elevated temperature to distill away solvent and remove co-products, and thereby achieve a desired softening point for the resin.

The β-pinene monomer is commonly obtained by distillation of crude sulfate turpentine, which is a by-product of the paper industry. Resin-grade β-pinene is generally about 80% by weight β-pinene with much of the remainder being α-pinene. Higher purity grades of α-pinene and β-pinene, such as those described in U.S. Pat. Nos. 4,057,682, 4,113,653 and 4,487,901, which are incorporated by reference herein in their entirety, having greater than 90% by weight pinene content, may also be used in preparing the terpene resins.

Other terpenes that may be used to prepare the polyterpene resin are limonene and dipentene. Limonene may be obtained as a byproduct of the citrus industry (orange peels). Dipentene obtained by pyrolysis or catalytic cracking of α-pinene (that is racemic limonene) may also be used in preparing the terpene resins.

The polyterpene resin may comprise, in addition to the above terpenes, various non-terpenic unsaturated compounds, particularly unsaturated hydrocarbons, such as, for example, olefins and dienes. Examples may include isobutylene, diisobutylene, 1-alkenes, 2-alkenes, trisubstituted alkenes, vinylcyclohexene, as well as piperylene and dicyclopentadiene streams obtained from steam cracking of petroleum distillates. The dicyclopentadiene streams may include piperylene, isoprene, 2-methyl-2-butene, 2-methyl- 1-butene, cyclopentene, an acyclic pentene, cyclopentadiene, and dicyclopentadiene and those additional compounds described in U.S. Pat. Nos. 6,121,392 and 3,959,238, both of which are incorporated by reference herein in their entirety.

Suitable terpene resins that may be used in the above-disclosed process include commercially-available terpene resins sold by the Arizona Chemical Company (Jacksonville, Fla.) designated as SYLVARES terpene resins M-1115, B-115, 7100, 7115, 7125, 1085, 1100, 1115, 1125, and A-25. Furthermore, additional suitable terpene resins include commercially-available terpene resins designated as SYLVAGUM TR 105 and SYLVAGUM TR 90. In embodiments, the terpene resins are solid at ambient temperature and have a softening point of from about 35 to about 120° C.

Styrenated terpene resins are examples of aromatic modified terpene resins. As used herein the phrase "styrenated terpene resins" includes any resin produced from the copolymers the terpene hydrocarbon monomers described above and styrene. In embodiments, styrenated terpene resins are solids at ambient temperature and have a softening point (SP) of from about 95 to about 115° C., a weight average molecular weight (Mw) of less than about 2000, a number average molecular weight (Mn) of less than about 1000, and a polydispersity of less than about 2.0. Examples of suitable styrenated terpene resin may include styrenated terpene resins made from d-limonene available under the ZONATAC 105 LITE (Arizona Chemical Co.), SYLVARES ZT-5100, SYLVARES ZT-105LT, SYLVARES ZT-106LT, SYLVARES M 106, each manufactured by Arizona Chemical Company, and those described U.S. Patent Application Publication No. 20080014454, which is incorporated by reference herein in its entirety. The styrenated terpene resins have a solubility parameter of less than 19 and some embodiments between 15 and 19 $(MPa)^{1/2}$.

The low-polarity additive may be present in the ink vehicle in an amount from about 0.5 to about 20 weight percent of the ink vehicle, from about 1 to about 10 weight percent of the ink vehicle, from about 1 to about 5 weight percent of the ink vehicle and from about 1 to about 3 weight percent of the ink vehicle.

In embodiments and in addition to the low-polarity additive, the composition may further comprise one or more additional low-polarity additives. Examples of the additional low-polarity additive may include aliphatic hydrocarbon resins, phenol-modified hydrocarbon resins, poly(styrene-allyl) alcohols, polyamide resins and mixtures thereof. Furthermore, the low-polarity additive and the additional low-polarity additive should be soluble in the solvent used to prepare the dispersed solution and have minimal impact on the conductivity of the annealed metal nanoparticle films prepared from the ink composition.

In embodiments, the composition may further comprise an aliphatic hydrocarbon resin. The aliphatic hydrocarbon resin may be classified, according to the type of monomer it comprises, such as, for example, indene hydrocarbon based resins, pentanediene hydrocarbon based resins, diene resins of cyclopentadiene dimers and indene monomers and mixtures thereof. The aliphatic hydrocarbon resin have a softening point from about 10° C. to about 115° C., from about 35° C. to about 90° C. and 45° C. to about 75° C.

Examples of indene hydrocarbon-based resins may include the resins derived from the polymerization in major proportion of indene monomer and in minor proportion of monomers chosen from styrene, methylindene and methylstyrene, and mixtures thereof, these resins possibly being hydrogenated. These resins may have a molecular weight ranging from 290 to 1150 g/mol. Examples of indene resins may include ESCOREZ 7105, manufactured by Exxon Chem.; NEVCHEM 100 and NEVEX100 each manufactured by Neville Chem.; NORSOLENE S105, manufactured by the company Sartomer, PICCO 6100, manufactured by the company Hercules, and Resinall by the company Resinall Corp. Additional examples may include the hydrogenated indene/methylstyrene/styrene copolymers sold under the name "REGALITE" by the company Eastman Chemical, in particular REGALITE R1100, REGALITE R1090, REGALITE R7100, REGALITE R1010 and REGALITE R1125.

Examples of pentanediene hydrocarbon-based may include resins such as those derived from the majority polymerization of the 1,3-pentanediene (trans or cis-piperylene) monomer and of minor monomers selected from isoprene, butene, 2-methyl-2-butene, pentene and 1,4-pentanediene, and mixtures thereof. These resins may have a molecular weight ranging from 1000 to 2500 g/mol. Examples of the 1,3-pentanediene hydrocarbon based resin may include those resins sold under the references PICCOTAC 95, manufactured by Eastman Chemical, ESCOREZ 1304 manufactured by Exxon Chemicals, NEVTAC 100, NEVTAC 10°, NEVTAC 80, NEVTAC 100, NEVTAC 115, SUPER NEVTAC 99, manufactured by Neville Chem; or WING-TACK 95, manufactured by Goodyear.

Examples of diene resins of cyclopentadiene dimers may include resins such as those derived from the polymerization of first monomers selected from indene and styrene, and of second monomers chosen from cyclopentadiene dimers such as dicyclopentadiene, methyldicyclopentadiene and other pentanediene dimers, and mixtures thereof. These resins generally have a molecular weight ranging from 500 to 800 g/mol, and are sold under the name BETAPRENE BR 100, manufactured Arizona Chemical Co.; NEVILLE LX-685, NEVILLE LX-125 and NEVILLE LX-1000, each manufactured by Neville Chem.; PICCODIENE 2215, manufactured by Hercules; PETRO-REZ 200, manufactured by Lawter; or Resinall 760 by the company Resinall Corp.

In embodiments, the composition may further comprise a phenol-modified resin. A phenol-modified resin may be produced by reacting or polymerizing a mixture containing indene, vinyl toluene, and dicyclopentadiene as polymerizable constituents or monomers in the presence of a phenol compound and a Friedel-Crafts type catalyst, as described in U.S. Pat. No. 3,993,626 and U.S. Pat. No. 4,471,106. Examples of phenol-modified resins include those phenol-modified resins that are available commercially from Univar USA, Jinan Haohua Industries Co. Ltd and Monsanto Company.

In embodiments, the composition may further comprise a suitable poly(styrene-allyl) alcohol. Suitable poly(styrene-allyl alcohols) include those poly(styrene-allyl alcohols) containing 33% and 40% allyl alcohol, such as, for example, those available from Sigma Aldrich and SAA-100, manufactured by Arco Chemical.

In embodiments, the composition may further comprise a suitable polyamide resin. Examples of suitable polyamide resins include polyesteramide resins of weight average molecular weight of less than 15,000 g/mole, available from Arizona Chemical and sold under the tradename UNIREZ, such as, for example, such as UNIREZ 2974 and UNIREZ 2980. These resins have a softening point from about 90° C. to about 140° C. and a viscosity at 130° C. between about 20 to about 150 cP.

The additional low-polarity additives may be present in the composition in an amount of at least 0.5 weight percent of the composition, such as for example from about 0.5 weight percent to about 4 weight percent, from about 1 weight percent to about 4 weight percent, from about 1 weight percent to about 3 weight percent and from about 2 weight percent to about 3 weight percent of the composition.

The composition may further comprise at least two low-polarity additives. Examples of the at least two low-polarity additives may include polyterpene resins, styrenated terpene resin, aliphatic hydrocarbon resins, phenol-modified hydrocarbon resins, poly(styrene-allyl) alcohols, polyamide resins and mixtures thereof. The at least two low-polarity additives may be present in the ink vehicle in an amount from about 0.5 to about 20 weight percent of the ink vehicle, from about 1 to about 10 weight percent of the ink vehicle, from about 1 to about 5 weight percent of the ink vehicle and from about 1 to about 3 weight percent of the ink vehicle The metal nanoparticles and the low polarity additive may be dispersed in any suitable dispersing solvent in forming a solution that may be used to form metal features on a substrate. In order to be used in a flexographic ink, the metal nanoparticles must be "loaded" into the composition in a sufficient weight percentage. This weight percentage of the metal nanoparticles in the solvent needs to be at least about 60 weight percent of the total composition, such as, for example, from about 75 to about 85 weight percent, or from about 75 to about 80 weight percent of the total composition.

The dispersing solvent should facilitate the dispersion of the unstabilized or stabilized metal nanoparticles and the low-polarity additive. Examples of the dispersing solvent may include, for example, an alkane or an alcohol having from about 10 to about 18 carbon atoms or from about 10 to about 14 carbon atoms, such as, undecane, dodecane, tridecane, tetradecane, 1-undecanol, 2-undecanol, 3-undecanol, 4-undecanol, 5-undecanol, 6-undecanol, 1-dodecanol, 2-dodecanol, 3-dodecanol, 4-dodecanol, 5-dodecanol, 6-dodecanol, 1-tridecanol, 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, and the like; a monoterpene alcohol, such as for example, terpineol ($\alpha$-terpineol), $\beta$-terpineol, geraniol, cineol, cedral, linalool, 4-terpineol, lavandulol, citronellol, nerol, methol, borneol, and the like; isoparaffinc hydrocarbons, such as, for example, isodecane, isododecane, and commercially available mixtures of isoparaffins such as ISOPAR E, ISOPAR G, ISOPAR H, ISOPAR L and ISOPAR M (all the above-mentioned manufactured by Exxon Chemical Company), SHELLSOL (made by Shell Chemical Company), SOLTROL (made by Philips Oil Co., Ltd.), BEGASOL (made by Mobil Petroleum Co., Inc.) and IP Solvent 2835 (made by Idemitsu Petrochemical Co., Ltd.); tetrahydrofuran; chlorobenzene; dichlorobenzene; trichlorobenzene; nitrobenzene; cyanobenzene; acetonitrile; dichloromethane; N,N-dimethylformamide (DMF); and mixtures thereof. One, two, three or more solvents may be used. In embodiments where two or more solvents are used, each solvent may be present at any suitable volume ratio or molar ratio such as for example from about 99 (first solvent):1 (second solvent) to about 1 (first solvent):99 (second solvent), including the volume ratio or molar ratio from about 80 (first solvent):20 (second solvent) to about 20 (first solvent):80 (second solvent).

The solvent may be present in the composition in an amount of at least 10 weight percent of the composition, such as for example from about 10 weight percent to about 30 weight percent, from about 10 weight percent to about 25 weight percent, from about 15 weight percent to about 25 weight percent and from about 15 weight percent to about 20 weight percent of the composition.

The composition containing the low polarity additive(s) may be optionally heated prior to deposition of the metal nanoparticles to a temperature of about at least 120° C., such as, for example, from about 120° C. to about 165° C., from about 125° C. to about 155° C., and from about 130° C. to about 145° C., for about 20 minutes to about 1 hour to accelerate the dissolution of the resin in the solvent. The metal nanoparticles can then be added thereafter.

In order to be used as a flexographic or screen-printing ink, the viscosity of the ink should be greater than 10 cP, for example, from about 10 cP to about 200 cP, from about 20 cP to about 100 cP, from about 30 cP to about 75 cP and from about 50 cP to about 75 cP in the temperature range of 20 to 50° C.

The fabrication of an electrically conductive element from the metal nanoparticle dispersion can be carried out by depositing the composition on a substrate using any suitable liquid deposition technique at any suitable time prior to or subsequent to the formation of other optional layer or layers on the substrate. Thus, liquid deposition of the composition on the substrate can occur either on a substrate or on a substrate already containing layered material, for example, a semiconductor layer and/or an insulating layer. The metal nanoparticle composition may be referred to as an ink when deposited on a substrate.

The phrase "liquid deposition technique" refers to, for example, deposition of a composition using a liquid process such as liquid coating or printing, where the liquid is an composition comprising a metal nanoparticle solution, a low-polarity additive and a solvent wherein the low-polarity additive is a styrenated terpene resin or a polyterpene resin. Examples of liquid coating processes may include, for example, spin coating, blade coating, rod coating, dip coating, and the like. Examples of printing techniques may include, for example, lithography or offset printing, gravure, flexography, screen printing, stencil printing, stamping (such as microcontact printing), and the like, with flexography being the desired printing technique. Liquid deposition deposits a layer of the composition having a thickness ranging from about 5 nanometers to about 5 millimeters, preferably from about 10 nanometers to about 1000 micrometers. The deposited metal nanoparticle composition at this stage may or may not exhibit appreciable electrical conductivity.

The substrate upon which the metal features are printed may be any suitable substrate, including, for example, silicon, glass plate, plastic film, sheet, fabric, or paper. For structurally flexible devices, plastic substrates, such as for example polyester, polycarbonate, polyimide sheets and the like may be used. The thickness of the substrate may be from amount 10 micrometers to over 10 millimeters with an exemplary thickness being from about 50 micrometers to about 2 millimeters, especially for a flexible plastic substrate and from about 0.4 to about 10 millimeters for a rigid substrate such as glass or silicon.

Heating the deposited composition at a temperature of, for example, at or below about 200° C., such as, for example, from about 80° C. to about 200° C., from about 100° C. to about 180° C., from about 120° C. to about 160° C. and from about 130° C. to about 150° C., to induce the metal nanoparticles or "anneal" the metal nanoparticles to form an electrically conductive layer, which is suitable for use as an electrically conductive element in electronic devices. The heating temperature is one that does not cause adverse changes in the properties of previously deposited layer(s) or the substrate (whether single layer substrate or multilayer substrate). Also, the low heating temperatures described above allows the use of low cost plastic substrates, which have an annealing temperature below 200° C.

The heating can be performed for a time ranging from, for example, 1 second to about 10 hours and from about 10 seconds to 1 hour. The heating can be performed in air, in an inert atmosphere, for example, under nitrogen or argon, or in a reducing atmosphere, for example, under nitrogen containing from 1 to about 20 percent by volume hydrogen. The heating can also be performed under normal atmospheric pressure or at a reduced pressure of, for example, from about 1000 mbars to about 0.01 mbars.

As used herein, the term "heating" encompasses any technique(s) that can impart sufficient energy to the heated material or substrate to (1) anneal the metal nanoparticles, (2) increase the dissolution of the low-polarity additive(s) in the solvent and/or (3) remove the optional stabilizer from the metal nanoparticles. Examples of heating techniques may include thermal heating (for example, a hot plate, an oven, and a burner), infra-red ("IR") radiation, a laser beam, microwave radiation, or UV radiation, or a combination thereof.

Heating produces a number of effects. Prior to heating, the layer of the deposited metal nanoparticles may be electrically insulating or with very low electrical conductivity, but heating results in an electrically conductive layer composed of annealed metal nanoparticles, which increases the conductivity. In embodiments, the annealed metal nanoparticles may be coalesced or partially coalesced metal nanoparticles. In embodiments, it may be possible that in the annealed metal nanoparticles, the metal nanoparticles achieve sufficient particle-to-particle contact to form the electrically conductive layer without coalescence.

In embodiments, after heating, the resulting electrically conductive layer has a thickness ranging, for example, from about 5 nanometers to about 5 microns and from about 10 nanometers to about 2 microns.

The conductivity of the resulting metal element produced by heating the deposited metal nanoparticle composition is, for example, more than about 100 Siemens/centimeter ("S/cm"), more than about 1000 S/cm, more than about 2,000 S/cm, more than about 5,000 S/cm, or more than about 10,000 S/cm.

The resulting elements can be used as electrodes, conductive pads, thin-film transistors, conductive lines, conductive tracks, and the like in electronic devices such as thin film transistors, organic light emitting diodes, RFID (radio frequency identification) tags, photovoltaic, printed antenna and other electronic devices which require conductive elements or components.

The embodiments disclosed herein will now be described in detail with respect to specific exemplary embodiments thereof, it being understood that these examples are intended to be illustrative only and the embodiments disclosed herein is not intended to be limited to the materials, conditions, or process parameters recited herein. All percentages and parts are by weight unless otherwise indicated. Room temperature refers to a temperature ranging for example from about 20 to about 25° C.

EXAMPLE 1

Preparation of Silver Nanoparticles

Silver acetate (0.167 g, 1 mmol) and 1-hexadecylamine (4.83 g, 20 mmol) were first dissolved in toluene (100 mL) by heating at 60° C. until silver acetate was dissolved. To this solution was added a solution of phenylhydrazine (0.43 g, 4 mmol) in toluene (50 mL) with vigorous stirring over a period of 10 min. The resulting reaction mixture was stirred at 60° C. for 1 hr before cooling down to room temperature. Subsequently, acetone (10 mL) was added to the reaction mixture to destroy any excess phenylhydrazine. Solvent removal from the reaction mixture gave a residue which was added to stirring methanol (100 mL) to precipitate the crude silver nanoparticle product. The crude silver nanoparticle product was isolated by centrifugation, washed with acetone twice, and then air-dried.

EXAMPLE 2

Preparation of Resin Composition A

A resin composition was prepared by adding 1.6 g of SYLVARES ZT-5100 (a styrenated terpene resin) to 18.4 g of ISOPAR G (isoparaffinic hydrocarbon solvent). The mixture was then heated to a temperature of 135° C. and stirred for 30 min at this temperature.

EXAMPLE 3

Preparation of Low Polarity Silver Paste A

A low polarity Silver paste was prepared by mixing 2.4 g of silver nanoparticles of above EXAMPLE 1 with 0.6 g of the composition of above EXAMPLE 2 and stirring the mixture for 30 minutes at room temperature. The viscosity of the resulting low polarity paste was found to be 50 cPs (as determined using a RFS-3 Rheometic Scientific rheometer with cone and plate geometry), making the paste suitable for lithographic printing applications.

EXAMPLE 4

Coating and Annealing of Silver Paste A

The low polarity metal paste from above EXAMPLE 3 was coated on a glass substrate using a spin coater at 1000 rpm and then annealed for 120 min at a temperature of 180° C. to form a thin-film of silver nanoparticles with a thickness of 2330 nm and 712 S/cm. Furthermore, the thin-film of silver nanoparticles exhibited no cracking and possessed sufficient adhesion to the glass substrate.

EXAMPLE 5

Preparation of Resin Composition B

A resin composition was prepared by 1.6 g of SYLVARES TR-1085 (a polyterpene resin) to a mixture of 12.4 g of ISOPAR G (isoparaffinic hydrocarbon solvent) and 6.13 grams of terpineol. The mixture was then heated to a temperature of 135° C. and stirred for 30 min at this temperature.

EXAMPLE 6

Preparation of Low Polarity Silver Paste B

A low polarity silver paste was prepared by mixing 2.4 g of silver nanoparticles of above EXAMPLE 1 with 0.6 g of the composition of above EXAMPLE 5 and stirring the mixture for 30 minutes at room temperature. The viscosity of the resulting low polarity paste was found to be 50 cP (as determined using a RFS-3 Rheometic Scientific rheometer with cone and plate geometry), making the paste suitable for lithographic printing applications.

EXAMPLE 7

Coating and Annealing of Silver Paste B

The low polarity metal paste from above EXAMPLE 6 was coated on glass substrate using a spin coater and then annealed for 120 min at a temperature of 180° C. to form a thin-film of silver nanoparticles with a thickness of 2400 nm and a conductivity of 710 S/cm. Furthermore, the thin-film of silver nanoparticles exhibited no cracking and possessed sufficient adhesion to the glass substrate.

EXAMPLE 8

Preparation of Resin Composition C

A resin composition was prepared by 1.6 g of NEVTAC 100 (an aliphatic hydrocarbon resin) to a mixture of 12.27 g of ISOPAR G (isoparaffinic hydrocarbon solvent) and 6.13 grams of terpineol. The mixture was then heated to a temperature of 135° C. and stirred for 30 min at this temperature.

EXAMPLE 9

Preparation of Low Polarity Silver Paste C

A low polarity silver paste was prepared by mixing 2.4 g of silver nanoparticles of above EXAMPLE 1 with 0.6 g of the composition of above EXAMPLE 8 and stirring the mixture for 30 minutes at room temperature. The viscosity of the resulting low polarity paste was found to be greater 50 cPs, making the paste suitable for lithographic printing applications.

EXAMPLE 10

Coating and Annealing of Silver Paste C

The low polarity metal paste from above EXAMPLE 9 was coated on a glass substrate using a spin coater and then annealed for 120 min at a temperature of 180° C. to form a thin-film of silver nanoparticles with a thickness of about 2400 nm and a conductivity of 710 S/cm. Furthermore, the thin-film of silver nanoparticles exhibited no cracking and possessed sufficient adhesion to the glass substrate.

Comparative Example 1

Coating and Annealing of a Low Polarity Silver Dispersion without a Styrenated Terpene Resin A low polarity nanosilver dispersion was prepared by mixing 2.4 g of silver nanoparticles of EXAMPLE 1 with 0.6 g of ISOPAR G at room temperature for a period of 30 min. The viscosity of the resulting low polarity paste was found to be about 50 cP (as determined using a RFS-3 Rheometic Scientific rheometer with cone and plate geometry). The low polarity dispersion (containing no styrenated terpene resin) was coated on a glass substrate using spin coater at 1000 rpm and then annealed for 120 min at a temperature of 150° C. to form a thin-film of silver nanoparticles with a thickness of 2450 nm having a conductivity of 795 S/cm. The film of silver nanoparticles exhibited thin cracks were observed in the film and did not sufficiently adhere to the surface of the substrate.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A composition comprising a metal nanoparticle solution including metal nanoparticles and a stabilizer, a low-polarity additive and a solvent,
   wherein the low-polarity additive is a styrenated terpene resin in an amount from about 0.5 to about 20 percent by weight of the metal nanoparticles solution.

2. The composition of claim 1, wherein the metal nanoparticles in the metal nanoparticle solution are selected from the group consisting of silver, gold, platinum, palladium, copper, cobalt, chromium, nickel, silver-copper composite, silver-gold-copper composite, silver-gold-palladium composite and mixtures thereof.

3. The composition of claim 1, wherein the metal nanoparticles in the metal nanoparticle solution are silver nanoparticles.

4. The composition of claim 1, wherein a concentration of metal nanoparticles in the metal nanoparticle solution is at least about 75 weight percent.

5. The composition of claim 1, wherein the stabilizer is an organoamine stabilizer selected from the group consisting methylamine, ethylamine, propylamine, butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and mixtures thereof.

6. The composition of claim 1, wherein the composition further includes an additional low-polarity additive selected from the group consisting of aliphatic hydrocarbon resins, phenol-modified hydrocarbon resins, poly(styrene-allyl) alcohols, polyamide resins and mixtures thereof.

7. The composition of claim 6, wherein the additional low-polarity additive is present in the metal nanoparticle solution in an amount from about 4 to about 20 percent by weight of the metal nanoparticle solution.

8. The composition of claim 1, wherein the solvent is an alcohol or an alkane having a boiling point of about 150° C. to about 250° C.

9. The composition of claim 1, wherein the solvent is selected from the group consisting of an isoparaffinic hydrocarbon solvent, a monoterpene alcohol, an alkane comprised of from about 10 to about 14 carbon atoms and mixtures thereof.

10. A method of forming conductive features on a substrate, the method comprising:
    providing a dispersed solution comprised of metal nanoparticles and a stabilizer, a low-polarity additive and a solvent, and
    depositing the solution onto the substrate, heating the solution on the substrate to a temperature from about 80° C. to about 200° C. to form conductive features on the substrate, and wherein the low-polarity additive is a styrenated terpene resin, a polyterpene resin or mixtures thereof, and wherein the low-polarity additive is present in the solution in an amount from about 1 to about 10 percent by weight of the solution.

11. The method of claim 10, wherein the metal nanoparticles in the metal nanoparticle solution are selected from the group consisting of silver, gold, platinum, palladium, copper, cobalt, chromium, nickel, silver-copper composite, silver-gold-copper composite, silver-gold-palladium composite and mixtures thereof.

12. The method of claim 10, wherein the solution may further include an additional low-polarity additive selected from the group consisting of aliphatic hydrocarbon resins, phenol-modified hydrocarbon resins, poly(styrene-allyl) alcohols, polyamide resins and mixtures thereof.

13. The method of claim 10, wherein the depositing is selected from the group consisting of spin coating, blade coating, rod coating, dip coating, lithography or offset printing, gravure, flexography, screen printing, stencil printing and stamping.

14. The method of claim 10, wherein the solvent is an alcohol or an alkane having a boiling point of about 150° C. to about 250° C.

15. The method of claim 10, wherein the solvent is selected from the group consisting of an isoparaffinic hydrocarbon solvent, a monoterpene alcohol, an alkane comprised of from about 10 to about 14 carbon atoms, and mixtures thereof.

16. A composition comprising a metal nanoparticle solution including metal nanoparticles and a stabilizer, a low-polarity additive and a solvent, wherein the low-polarity additive is a styrenated terpene resin, a polyterpene resin or mixtures thereof, and wherein the low-polarity additive is present in the metal nanoparticle solution in an amount from about 1 to about 10 percent by weight of the metal nanoparticle solution.

17. The composition of claim 16, wherein the low-polarity additive has a weight average molecular weight from 800 to 3,000, a softening point from 35° C. to 140° C., and a solubility parameter of less than 19 $(MPa)^{1/2}$.

18. The composition of claim 16, wherein the low-polarity additive is a styrenated terpene resin having a softening point from 95° C. to 115° C., a weight average molecular weight of less than 2,000, a number average molecular weight of less than 1,000, a polydispersity of less than 2, and a solubility parameter of less than 19 $(MPa)^{1/2}$.

* * * * *